April 22, 1930.  W. E. GOLDSBOROUGH  1,755,578
RECIPROCATING ENGINE
Filed Feb. 15, 1926
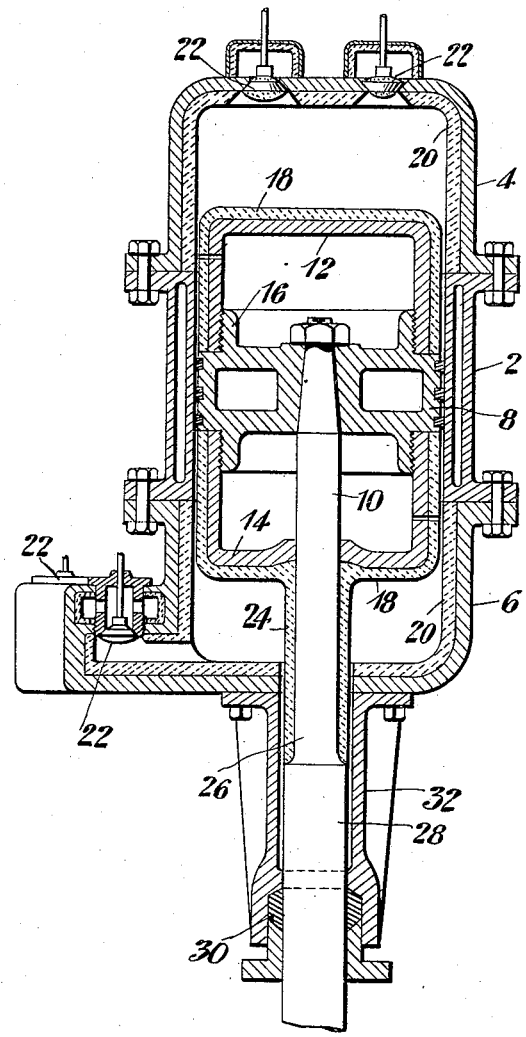
Inventor
W. E. GOLDSBOROUGH
By his Attorney
Edmund G. Borden Patented Apr. 22, 1930

1,755,578

UNITED STATES PATENT OFFICE

WINDER E. GOLDSBOROUGH, OF SOUTH NORWALK, CONNECTICUT, ASSIGNOR TO DOHERTY RESEARCH COMPANY, OF NEW YORK, N. Y., A CORPORATION OF DELAWARE

RECIPROCATING ENGINE

Application filed February 15, 1926. Serial No. 88,203.

This invention relates to improvements in reciprocating engines and more particularly to engines of the type wherein both sides of the piston are subject to impulses from exploding gases, that is to say, to engines of the double-acting type. In engines of this type difficulty is experienced in protecting the piston rod from the deleterious effects of the burning gases.

It is an object of the invention to provide means for protecting the exposed portion of the piston rod from the deleterious effects of the high temperature gases and to this end a piston rod is provided with a sleeve of refractory material about that portion of its length which enters the cylinder.

Another object of the invention is to provide a double-acting piston with piston rod extensions of a novel character whereby the working space of the piston proper may be protected from the deleterious effects of the burning gases.

For a fuller understanding of the invention reference is made to the detailed description thereof taken in connection with the accompanying drawings forming part of this specification.

The single figure of the drawings is a longitudinal sectional view through an engine constructed in accordance with the present invention and showing the preferred manner of protecting the exposed portion of the piston rod and also the preferred form of the piston extensions.

The working cylinder is shown as made in three sections, 2, 4 and 6, the middle section being shown as provided with a water jacket and of a length equal to the working stroke of the piston.

The piston proper is indicated at 8 and is secured to its piston rod 10 in any suitable manner but preferably as shown. Both sides of the piston are provided with piston extensions 12 and 14 which are preferably secured to the piston in the manner shown, namely by being screwed onto annular flanges 16 extending from the piston. These piston extensions are preferably provided with a lining of refractory material generally indicated at 18.

The cylinder extensions 4 and 6 are also preferably interiorly provided with a lining of refractory material generally indicated at 20. Suitable valves 22 are provided at each end of the cylinder, these valves being more or less diagrammatically illustrated. That part of the piston rod which enters the cylinder is provided with a sleeve 24 of refractory material. It is preferred to make this sleeve as a continuation of the refractory lining on the piston extension 14 thereby avoiding objectionable joints. The piston rod is preferably of reduced diameter along that portion of its length encompassed by the sleeve as indicated at 26, the construction being such that the external diameter of the sleeve is the same as the unreduced portion 28 of the piston rod.

The piston rod passes through a stuffing box 30 formed at the outer extremity of a sleeve-like extension 32 secured to the cylinder section 6, said extension being of such length that the refractory lined portion 26 of the piston rod will not enter the stuffing box and of such diameter that the sleeved portion of the piston rod fits snugly therein.

By arranging for the passage of the piston rod through a stuffing box considerably removed from the cylinder and by providing the exposed portion of the piston rod with the refractory lining, any tendency of the rod to become overheated when it passes through the stuffing box is entirely avoided. The piston extensions serve to protect the piston proper from the deleterious effects of the burning gases and also enable more effective cooling of the intermediate cylinder section to be effected as will be readily understood.

What is claimed is:

1. A piston rod comprising a rod having a portion of its length of reduced diameter and a sleeve of refractory material telescoped over the portion of reduced diameter.

2. A piston rod having a portion of its length of reduced diameter and a sleeve of refractory material telescoped over said reduced portion, the external diameter of the sleeve being substantially the same as that of the unreduced portion of the rod.

3. The combination with a piston and piston rod, of a piston extension on the piston rod side thereof, a lining of refractory material about said extension, and a sleeve of refractory material extending from said lining and encompassing the piston rod for a portion of its length, said portion of the piston rod surrounded by the sleeve being of reduced diameter.

4. The combination of a cylinder, a sleeve extending from one end of the cylinder, a piston rod extending through said sleeve, a piston-rod stuffing-box at the outer extremity of the sleeve, a piston secured to said rod, a piston extension having a coating of refractory material on the piston rod side thereof and having a sleeve of refractory material telescoped about a portion of said rod, the stuffing box sleeve being of a length to receive the sleeved portion of the piston rod without permitting it to enter the stuffing box at the end thereof and the length of the refractory sleeve being substantially equal to the piston stroke.

5. In combination, a cylinder, a piston, a piston rod for the piston, said piston adapted to receive explosive impulses on its piston rod side, means for protecting the piston rod from the hot gases within the cylinder, said means comprising a sleeve of refractory material telescoped over the exposed portion of the piston rod, and a piston-rod-receiving extension on the cylinder within which the sleeved portion of the piston-rod is slidable with minimum clearance volume.

6. In combination, a cylinder, a piston, a piston rod for the piston, said piston adapted to receive explosive impulses on its piston rod side, means for protecting the piston rod from the hot gases within the cylinder, said cylinder having an outward extension through which said rod passes, and a stuffing box on the outer end of said extension through which the unprotected portion of the piston rod is adapted to pass.

7. In combination, a cylinder, a piston, a piston rod for the piston, said piston adapted to receive explosive impulses on its piston rod side, means for protecting the piston rod from the hot gases within the cylinder, said means comprising a sleeve of refractory material telescoped over the exposed portion of the piston rod, said cylinder having an outward extension through which said piston rod passes, and a stuffing box at the outer end of said extension through which the unexposed portion of the piston rod is adapted to pass.

8. In combination, a cylinder, a sleeve extending from one end of said cylinder, a piston rod extending through said sleeve, a piston stuffing box on the outer extreme end of said sleeve, a piston secured to said rod, said rod having a sleeve of refractory material telescoped about the portion thereof adjacent said piston, said cylinder sleeve being of a length to receive the refractory sleeve on the piston rod without permitting the refractory to enter the stuffing box at the end of said sleeve, the length of the refractory sleeve being substantially equal to the piston stroke.

9. In combination, a cylinder, a piston, a piston rod for the piston, said piston adapted to receive explosive impulses on its piston rod side, means for protecting said piston rod from the hot gases within the cylinder, said means comprising a sleeve of refractory material telescoped over the exposed portion of said piston rod, and means for forming a fluid tight joint between said cylinder and the unprotected portion of said piston rod, said second mentioned means including a sleeve extending from said cylinder and terminating in a stuffing box.

In testimony whereof I affix my signature.

WINDER E. GOLDSBOROUGH.